Feb. 14, 1956  L. LEITZ ET AL  2,734,434
APPARATUS FOR COUPLING AN EXCHANGEABLE OBJECTIVE
WITH A RANGE FINDER OF A PHOTOGRAPHIC CAMERA
Filed March 21, 1955  5 Sheets-Sheet 1

Feb. 14, 1956 L. LEITZ ET AL 2,734,434
APPARATUS FOR COUPLING AN EXCHANGEABLE OBJECTIVE
WITH A RANGE FINDER OF A PHOTOGRAPHIC CAMERA
Filed March 21, 1955 5 Sheets-Sheet 3

INVENTORS
Ludwig Leitz
BY Kurt Gissel

Benj. T. Rauber
their attorney

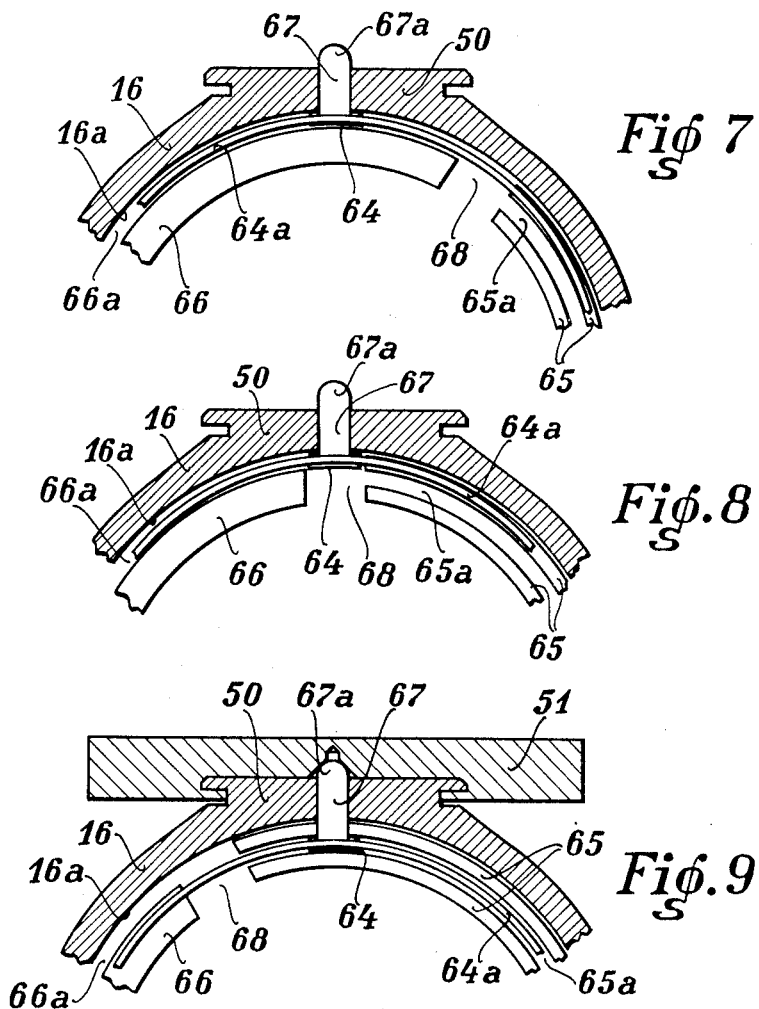

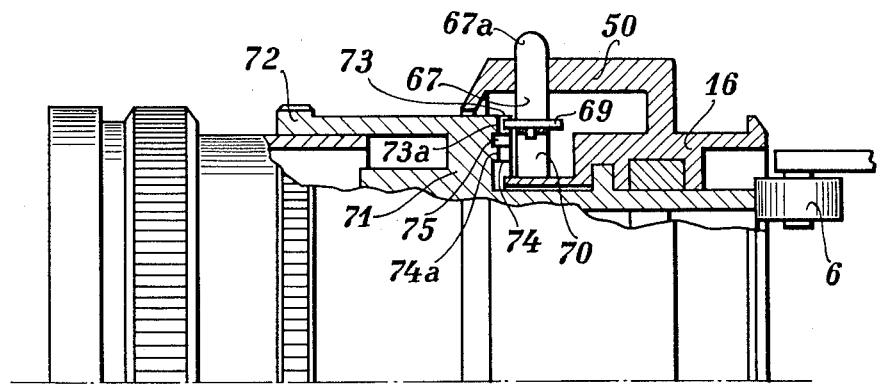
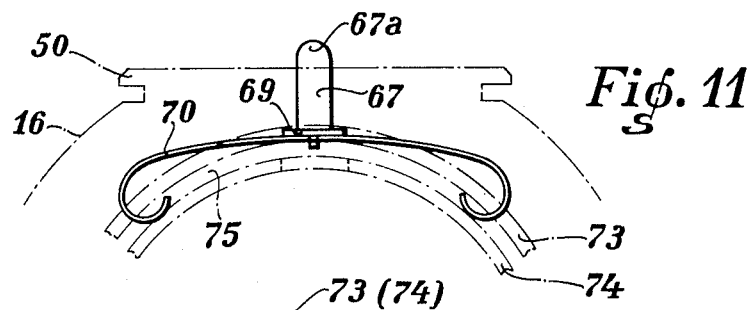
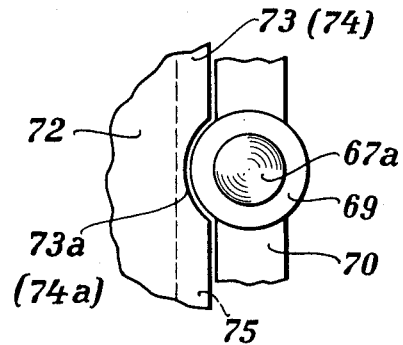

United States Patent Office 2,734,434
Patented Feb. 14, 1956

2,734,434

APPARATUS FOR COUPLING AN EXCHANGEABLE OBJECTIVE WITH A RANGE FINDER OF A PHOTOGRAPHIC CAMERA

Ludwig Leitz and Kurt Gissel, Wetzlar (Lahn), Germany, assignors to Ernst Leitz, G. m. b. H., Wetzlar (Lahn), Germany, a corporation of Germany Application March 21, 1955, Serial No. 495,613

Claims priority, application Germany April 2, 1954

8 Claims. (Cl. 95—44)

Our invention relates to a photographic camera with a range finder whose adjustment is coupled with the focusing mount of the objective, exchangeable for given conditions, and whose usable range (measuring range and/or picture field area) is changeable through interchangeable optical attachments.

According to the disclosures of our co-pending patent application Ser. No. 446,882, filed July 30, 1954, the focusing mount of objective and the adjustment of the range finder are brought into interdependence by means of stop and switching means in such manner that adjustment of the range finder is possible only within the relatively associated ranges.

Our present invention provides further improvements on apparatus of this type which are in accord with cameras constructed by the assembly of prefabricated parts and provides an essentially simplified construction and renders the apparatus more fool proof in use.

Our invention is illustrated in two typical examples. Of these examples the first relates to an objective in a focusing mount with an extended range of adjustment provided for special measurements in order to enable it to be used in the simplest possible and most fool-proof manner with an exposed range finder for a smaller range of adjustment. In the second example a fundamental concept of the invention provides a further application of a part of the abovementioned measures for the objective which permits another objective range to be taken than can be surveyed with a range finder covered by a standard focal length.

The various elements of our invention are illustrated for the two illustrative examples in the accompanying drawings, in which Fig. 1 is a front elevation of a camera with an objective and a carrier mounted on the objective with the shifting elements for the range finder;

Fig. 7 is a section on a plane closely parallel to line V—V of Fig. 5 of a part of the stop mechanism in one position;

Fig. 8 is a similar section showing the elements in another position;

Fig. 9 is a similar section showing the elements in another position;

Fig. 10 is a side view, partly in section, of a simpler construction of a stop mechanism for an objective with only one range of adjustment;

Fig. 11 is a view of elements of the stop mechanism of Fig. 10 taken transversely of the section of Fig. 10, and Fig. 12 is a plan of the elements of Fig. 11.

Figure 1:
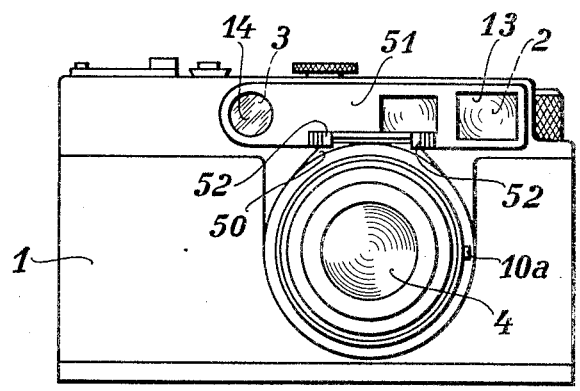
Figure 2:
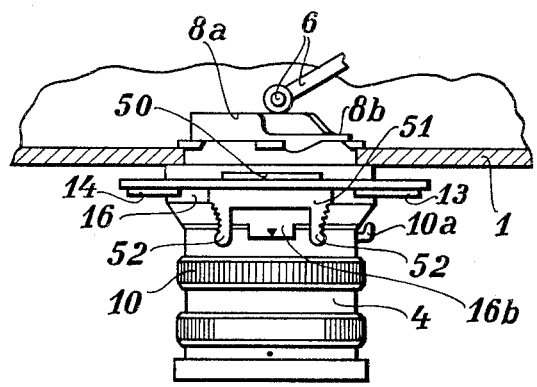
Fig. 2 is a plan view of the objective of Fig. 1 and a portion of the camera housing shown in section.
Figure 3:
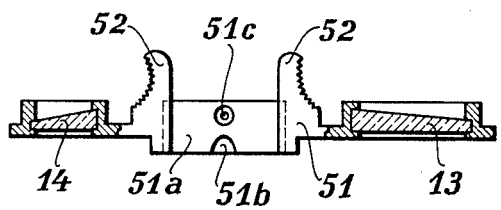
Fig. 3 is a bottom plan view of the carrier of the shifting element for the range finder partly in section in which the shifting elements are shown as optical wedges.

Referring to Figs. 1 to 3, a camera 1 with a built-in range finder and with viewing windows 2 and 3 is provided with an exchangeable objective 4. The mounting of the objective 4 on the camera 1 is accomplished in any of the usual ways, for example, as shown in Fig. 2 by means of a bayonet joint. Upon mounting the objective 4 on the camera a positioning rail, as shown in Fig. 2 as a stepped curve 8a, 8b, for the range finder, comes into working engagement with probe arm 6 of the optical rocking member, not shown, of the range finder. The adjustment for definition of the objective 4 follows also in known manner upon the rotational shifting of an actuating member, for example of a rotating ring 10 of the rotatable and axially slidable part of the objective mounting, designated collectively hereafter as "adjustment mounting," designated collectively hereafter as "adjustment mounting," whereupon the positioning rail actuates the probe lever 6 of the range finder.

The combination formed between the camera and objective and the part carrying the adjustment mounting of the objective, hereinafter collectively designated as "coupling mounting 16," is provided with a base 50 on which a carrier 51 for the optical shifting members 13, 14 for the range finder viewing windows 2, 3 is slidable. The carrier 51 is suitably provided with handles 52 which facilitate the insertion of the carrier onto the base 50 or its withdrawal therefrom. The carrier 51, moreover, has notches 51b and 51c on its guiding side adapted for mounting the base 50 for a purpose to be disclosed later.

Optical members 13, 14 of the carrier to be in front of the windows 2, 3 when the carrier is mounted, consisting for example of optical wedges (Fig. 3), can serve to impart to the range finding light beams a supplemental deflection to impart finder parallax under equilateral interference. The optical members 13, 14 can consist however also of an optically built-up system, for example an inverted Galileo system (Fig. 4) which can, in known manner, adjust the optical relations of any given range finder constructed for example of standard focal length, to another objective focal length, for example a wide angle objective.

Figure 5:
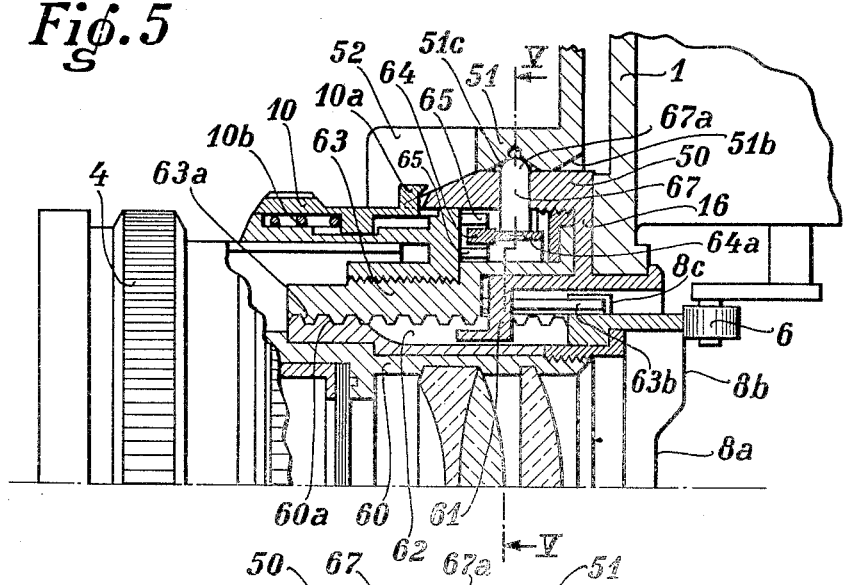
Fig. 5 is a partial side elevation of the camera with the objective, partly in section.
Figure 6:
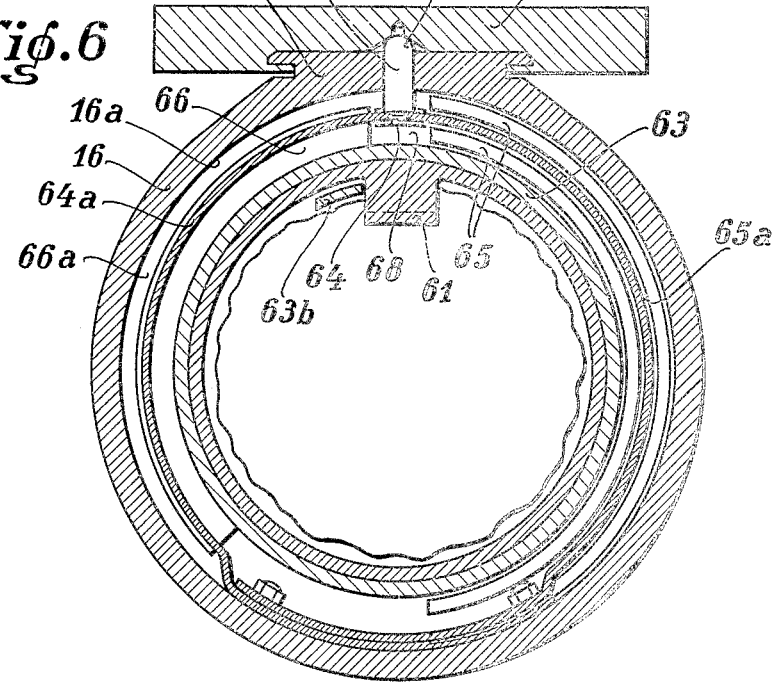
Fig. 6 is a cross-section through the objective on a line V—V of Fig. 5.

According to Fig. 5 the positioning rail formed as a stepped curve 8a, 8b is rotatably mounted on an optic carrier 60 which is movable in a straight line direction on the adjustment mounting. The straight line movement is obtained through a guide piece 61 of the coupling mounting 16 which engages in a corresponding groove 62 of the optic carrier. The optic carrier 60 has a screw thread 60a which meshes with a corresponding screw thread 63a of a rotatable but axially fixed part 63 of the adjustment mounting. By turning the screw 63a the objective 4 is shifted axially but through the guides 61, 62 is prevented from turning. The stepped curve 8a, 8b takes part in this axial shifting. The adjustment screw 63, 63a has also a coupling member 63b which extends into the range of a coupling member 8c combined with the stepped curve 8a, 8b and transmits the turning movement of the screws 63, 63a to the stepped curve 8a, 8b without hindering their axial movement.

The adjustment mounting 63 is provided with stop segments 65, 66 (Figs. 5 and 6) which co-operate with a stop plate 64 of a spring loop 64a mounted within the coupling mounting 16 (Figs. 5–9). The spring loop 64a carries a bolt 67 which is guided in a bore of the base 50. The stop segments 65 have between them a groove 65ᵃ which after setting the bolt serves for the reception of the stop plate 64 of the spring loop 64ᵃ. Between the stop segment 66 and the inner wall 16ᵃ of the coupling mounting 15 a further groove 66ᵃ is formed which is radially displaced relatively to the groove 65ᵃ and serves to receive the stop plate of the spring loop 64ᵃ in another setting of the bolt 67. Between the stop segments 65, 65 and 66 there is a space 68 free of the stop segments in which, upon a corresponding setting of the adjustment mounting, the stop plate 64 of the spring loop 64ᵃ can freely move radially upon actuation of the bolt 67. The spring loop 64ᵃ strives to press the bolt 67 radially outwardly so that a dome 67ᵃ at its end extends through the base 50 so that according to its setting and the setting of the stop plate 64 relative to the stop segments 65, 65 and 66, respectively, by a radial withdrawal the plate 64 stops or permits the shifting of the carrier 51 for the optical attachment elements 13 and 14.

The coupling mounting 16 also has, as an example, a further stop segment 16ᵇ arranged in the range of the base 50 (Figs. 7a and 8a) which extends into the path of rotation of a pin 10ᵃ combined with a rotatable driving member 10 of the adjustment mounting. The circumferential length of the stop segment 16ᵇ corresponds to the turning path necessary for the transfer from one curve step 8ᵃ to the other curve step 8ᵇ. The circumferential length of stop segment 16ᵇ can however also be determined in such manner that moreover a determined distance range of the adjustment by means of the range finder will be excluded. The rotatable driving member 10 (Fig. 5) for the adjustment mounting is mounted to slide axially on the adjustment mounting against a spring 10ᵇ (Fig. 5) for a certain distance so that the pin 10ᵃ is moved out of the range of the stop segment 16ᵇ and—with a further rotation of the driving member 10—can be lifted over it (arrow in Figs. 7a and 8a).

The mode of operation of the apparatus is as follows:

Camera 1 and objective 4 are joined together. Two adjustment ranges are provided, namely "∞–1 m." and "0.8–0.45." The adjustment range of ∞–1 m. should be used first. The probe lever 6 of the range finder thereupon glides onto the curved step 8ᵃ. No optical shifting member is present in front of the range finder windows 2, 3. Hence the bolt 67 projects with its dome 67ᵃ out of the base 50. The stop plate 64 is located in the range of the groove 66ᵃ (Fig. 7). The adjustment mounting is enabled to turn only so far as the stop base 64 is not hindered in the groove 66ᵃ, namely the pin 10ᵃ does not stop against the stop segment 16ᵇ. The path of the stop plate 64 in the groove 66ᵃ is limited in the direction of adjustment to ∞ by the length of this groove. The turning path of the adjustment mounting is limited in the opposite direction of adjustment to the 1 m. distance by the pin 10ᵃ and the stop segment 16ᵇ.

Figure 7A:
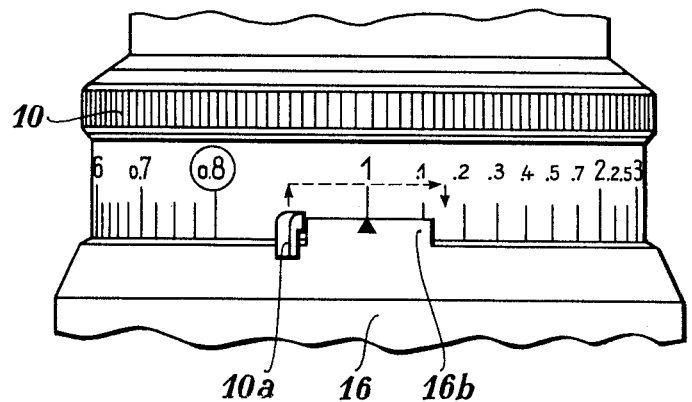
Fig. 7a is a view of a part of the focusing mount of the objective taken from the opposite side from that of Fig. 2 showing an adjusting ring in one position.
Figure 8A:
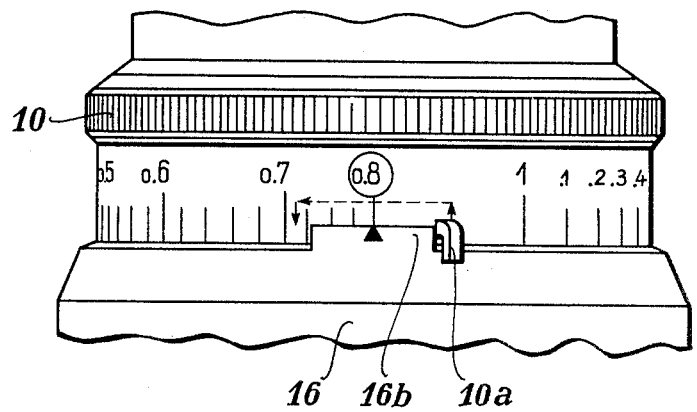
Fig. 8a is a similar view of the portion of the focusing ring in another position of adjustment.

Upon adjustment to 1 m. the stop pin 10ᵃ strikes against one side of the stop segment 6ᵇ (Fig. 7a). If a distance smaller than 1 m. is to be adjusted, then it is first necessary to withdraw the pin 10ᵃ by an axial shifting and turning of the driving member 10 over the stop segment 16ᵇ to the position shown in Fig. 8a. Thereupon the probe member 6 of the range finder is guided from the curve step 8ᵃ onto the curve step 8ᵇ and thereby the movable optical deflection member of the range finder is brought back into its starting position (∞ position). During this change over, the free space 68 between the stop segments 65 and 66 is in the range of the stop plate 64 of the spring loop 64ᵃ (Fig. 8). After the resulting shifting about, the turning movement of the driving member 10 and with it of the adjustment mounting is stopped in each direction; in the direction to ∞ through contact of the stop pin 10ᵃ with the stop segment 16ᵇ, in the direction to "0.45" by contact of the stop plate 64 of the spring loop 64ᵃ with the stop segment 65 (Figs. 8 and 8a).

Stopping of the adjustment mounting for the adjustment of shorter distances than 0.8 m. is overcome by inserting on the base 50 the carrier 51 with the elements in series for the range finder, in this case the optical wedges. Thereby the bolt 67 and stop plate 64 are forced radially inwardly overcoming the spring pressure of the spring loop 64ᵃ whereby the stop plate 64 passes into the space 68 in the range of the groove 65ᵃ. The mounted carrier 51 holds the stop plate in this radial position toward the axis of rotation of the adjustment mounting. If the adjustment mounting is turned for an adjustment to a distance less than 0.8 m., the stop plate 64 presses into the groove 65ᵃ (Fig. 9). The extent of this range of turning is bounded by the length of this groove. The probe member 6 of the range finder and the range locator no longer slides onto the curved step 8ᵇ.

The range of position which is necessary for the transfer from the step curve 8ᵃ to the step curve 8ᵇ is bounded by the circular length of the stop segment 16ᵇ thereupon falls out of commission for an objective adjustment coupled with the range finder.

The attachment of the optical wedges in front of the viewing windows 2, 3 of the range finder imparts to the measuring and probing picture light beams an additional deflection to each other so that in combination with the shifting of the optical deflecting members by means of the probe lever 6 of the range finder essentially shorter distances can be measured and adjusted without optical attachment members. Accordingly for close distances the same range of adjustment of the probe member 6 is again used, which without the optical attachment members 13 and 14 is to be used for the standard distance of ∞–1 m.

The recess 51ᵇ of the carrier 51 forms a run out way for the dome 67ᵃ of the bolt 67 and facilitates its radial positioning upon shifting the carrier 51 on the base 50, then presses the dome 67ᵃ of the bolt 67 into the recess 51ᶜ of the carrier 51 and insures its position. The depth of the recess 51ᶜ and the length of the bolt 67 are so selected that both can be brought into engagement with each other when the stop segment free space 68 comes into the range of the bolt 67 and the stop plate 64. In every other position of the adjustment mounting in which the stop plate 64 is within the grooves 65ᵃ or 66ᵃ, the bolt 67 because of its length cannot move radially outward to come into contact with the recess 51ᶜ. The carrier 51 is also insured against withdrawal from the base 50 and can be removed only when the adjustment mounting is in the above provided position of rotation.

The above described shiftings can also proceed in other sequences, namely in such a way that the rotation range from ∞ to the 1 m. mark will be terminated at the latter as by contact of the pin 10ᵃ with the stop segment 16ᵇ, as also by contact of the plate 64 with the upper stop segment 65. The plate 64 is then located in the free space 68 between the stop segments 65 and 66. A reverse lifting of the stop pin 10ᵃ over the stop segment 16ᵇ is possible only after the optical attachment members 13, 14 shall have been slid onto the base 50.

By bringing the carrier 51 for the optical attachment member 13, 14 of the range finder onto the base 50 the stop plate 64 will be brought by a radial shifting of the bolt 67 into the range of the groove 65ᵃ so that a rotational setting of the adjustment mounting for close distances smaller than 1 m. to 0.8 m. is no longer possible after the contact pin 10ᵃ has been lifted backwardly over the stop segment 16ᵇ.

The embodiment of the adjustment mounting of Figs. 10 to 12, by way of example, differs from that described above through the arrangement only of a positioning way without steps for the probe lever 6 of the range finder and a simpler construction of the stop means. It has in view the adaptation of a wide angle objective on a range detector which is designed for a standard objective so that its picture field corresponding to the detector picture field for the wide angle objective without the attachment of optical means is too small. In this case an optical image forming system is provided as an optical attachment which increases the viewing angle of the range finder viewers 2, 3. For both range detector viewers 2, 3 there are provided with consideration of unequal optical length of paths in the range finder equal optical systems, for example inverted Galileo systems, in order to let the measuring image and the detector image appear in equal measure in the measuring-detecting image field. By this means the certainty of measurement is on the one hand increased; on the other hand the further measuring controllable range of adjustment is permitted hereby to be increased.

The stop means of the adjustment mounting has in this form of embodiment only the purpose of forcing the fitting of the optical attachments so that without these an actuation of the adjustment mounting is prevented. The stop mechanism is for this purpose, however, so constructed that the stopping can be switched off by hand operation of the stop members. Hereby the user is afforded the opportunity to use his objective also without mounting the optical attachment, for example, for snapshot exposures with protected distance adjustment of the objective. The necessity of the previous hand actuation of the stop member before the adjustment of the selected distance serves as a notice that the detector image returns a smaller image area than the objective receives. Moreover, by this means the application of the objective is made possible together with a special detector detachably mounted in the usual manner on the accessory clip of the camera.

Figure 4:
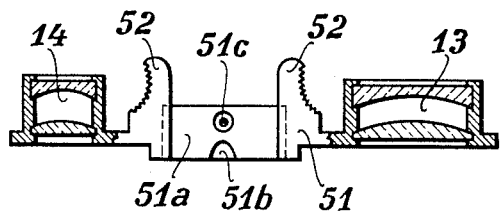
Fig. 4 is a bottom view of the carrier of Fig. 3 in which the optical shifting elements are shown as a reversed Galileo system.

In this form of embodiment the coupling mounting 16 of the objective is again equipped with a base 50 for the attachment of a carrier 51 with optical attachment having elements 13, 14 as shown in Fig. 4. A bolt 67 is guided radially in a bore of the base, Fig. 10. The bolt 67 has a stop flange 69. It is acted upon by a leaf spring 70 secured in the coupling mounting (Fig. 11) which presses the bolt outwardly.

A rotatable, axially fixed, part 71 of the adjustment mounting (Fig. 10) actuated by a raised ring 72 to be gripped by the operator, carries two concentrically spaced stop segments 73, 74. The stop segments 73, 74 and the groove 75 are in the radial stopping range of the stop flange 69.

The stop segments 73, 74 are provided with two coinciding matched notches 73ª, 74ª of the form of the stop flange 69 (Fig. 12) which lie exactly in radial superposition and are associated with a predetermined setting of the adjustment mounting, for example, the ∞ setting. In this setting the notches 73ª, 74ª are in the shifting range of the stop flange 69 so that it can be moved freely through them in a radial direction. In the position of rest without the mounting of the carrier 51 the stop flange 69, however, locks in the notch 73ª of the stop segment 73. The dome 67ª of the bolt 67 then projects out of the base 50. The actuation of the adjustment mounting is now possible when the bolt 67 is pressed inwardly in the base until, upon a turning adjustment of the actuating ring 72, stop flange 69 enters the groove 75. As long as the stop flange 69 remains in the groove the bolt cannot be displaced radially so that no carrier 51 can be slid onto the base 50.

If the adjustment mounting is used with the carrier 51 mounted for the optical attachment 13, 14—and this is in this case the normal use for which the adjustment mounting is designed—then the sliding of the carrier 51 onto the base can take place only in locking position of the adjustment mounting because only in this position can the bolt sufficiently withdraw radially. Upon sliding the carrier 51 onto the base 50, the bolt 67 and the stop flange combined with it are first pressed back against the action of the spring 70 so that the stop flange 69 arrives in the notch 74ª of the inner stop segment 74. The inward pressing of the bolt 67 is facilitated by the curved notch 51ᵇ of the carrier 51. If the carrier 51 is correctly shoved on then the bolt 67 is pressed into the recess 51ᶜ of the carrier 51. The length of the bolt 67 and the depth of the recess 51 are so co-related that the stop flange 69 is in the range of the groove 75 and with a turning adjustment of the actuating ring 72 is forced into it. The carrier 51 is thereby insured against withdrawal from the base 50 as long as the locking position (∞-position) is not reached.

Having described our invention, what we claim is:

1. A photographic camera having an objective having an adjustment mounting, a range finder on said camera having an adjustment means coupled with the adjustment mounting of the objective, an optical attachment for said range finder mountable and demountable on said camera, said adjustable mounting for said objective having a stop means for limiting the range of adjustment of said objective, and means actuated by the demounting and mounting of said optical attachment for varying the range of adjustment of said adjustable mounting.

2. The photographic camera of claim 1 in which said means actuated by the mounting and demounting of said optical attachment comprises a stop spring pressed into the path of mounting of said optical attachment and displaceable by the mounting of said attachment, and stop segments rotatable with the adjustment mounting and positioned to be stopped by said spring pressed stop when displaced by said optical attachment.

3. The photographic camera of claim 2 in which the stop segments are positioned concentrically and form grooves to receive an engaging portion of the spring pressed stop to permit rotation of the segments and adjustment mounting.

4. The photographic camera of claim 2 in which the adjustment means of the range finder is coupled to the adjustment mounting of the objective by means of a stepped circular rail and an actuated follower in which each step is co-ordinated with a stop segment and a releasable stop mounted on the rotatable part of the adjustment mounting to engage spaced stops on the stationary mounting of the objective.

5. The photographic camera of claim 4 having a spring pressed actuating ring movable by hand to rotate the adjustment mounting and movable axially against spring pressure to release said stop.

6. The photographic camera of claim 1 having interchangeable objectives of different focal lengths, a pair of concentric stop segments rotatable with the adjustment mounting of said objectives and having coinciding, superposed notches, and a spring pressed stop having a part positioned to move radially through said notches in a predetermined position of said adjustment mounting and having a part projecting to be engaged by the optical attachment when mounted and to move said radially movable part into said notches.

7. The photographic camera of claim 6 in which the optical attachment has a recess to receive the part of said spring pressed stop to be engaged by said optical attachment and in which said stop segments have grooves to receive said part movable radially through said notches when said segments are rotated and to hold said part in said recess and prevent said attachment from being removed.

8. The photographic camera of claim 6 in which said projecting part may be manually pushed radially inwardly.

No references cited.